June 19, 1962  F. B. MILLER  3,039,574
GRILLWORK PANEL AND METHOD FOR MAKING SAME
Filed Feb. 15, 1960  4 Sheets-Sheet 1
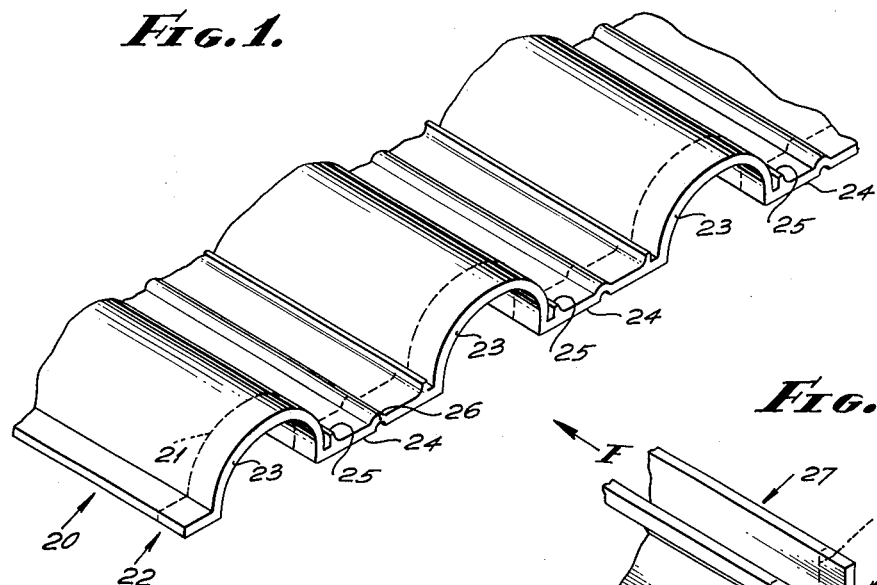
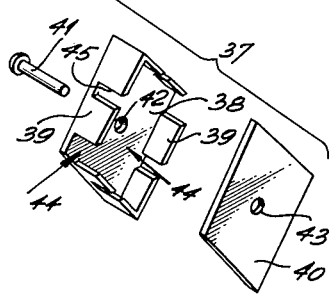
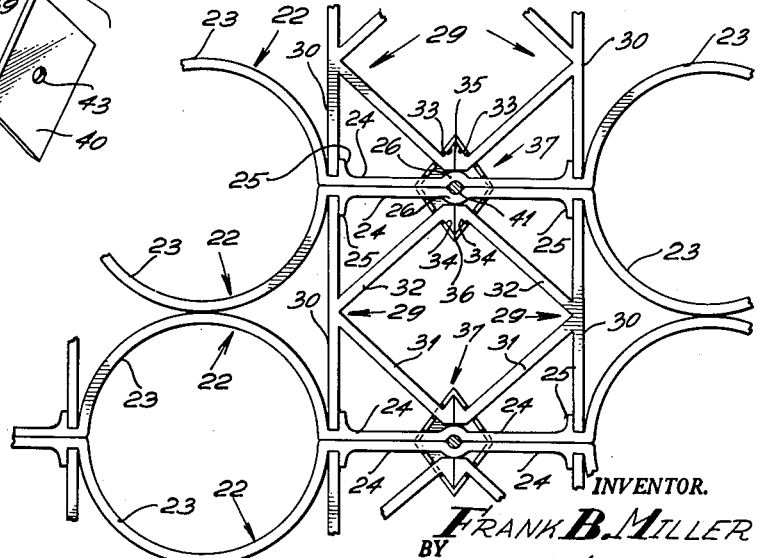
INVENTOR.
FRANK B. MILLER
BY R. E. Geauque
ATTORNEY June 19, 1962  F. B. MILLER  3,039,574
GRILLWORK PANEL AND METHOD FOR MAKING SAME
Filed Feb. 15, 1960  4 Sheets-Sheet 2
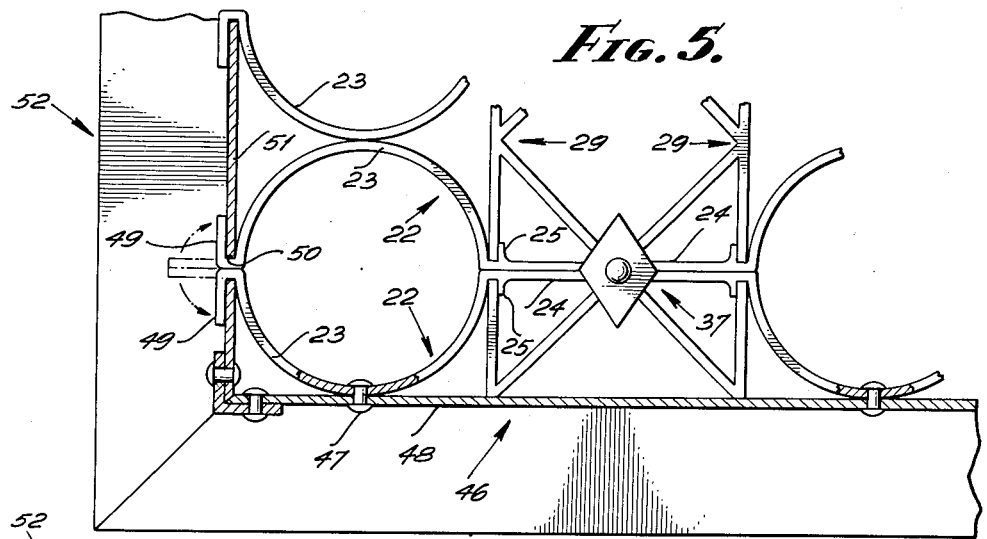
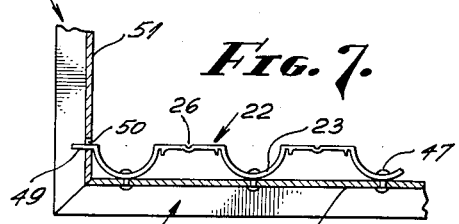
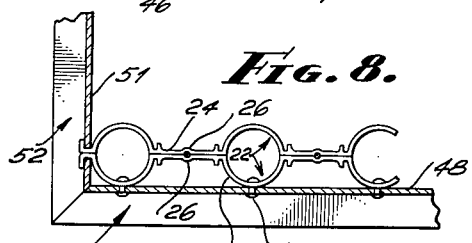
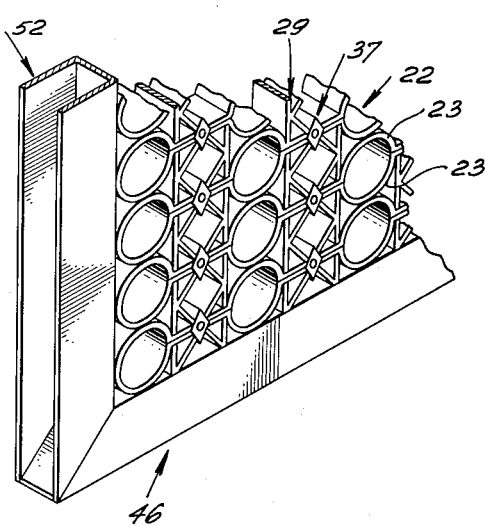
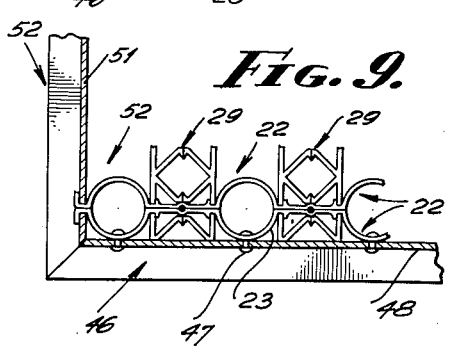
INVENTOR.
FRANK B. MILLER
BY
R. E. Jeaugue
ATTORNEY

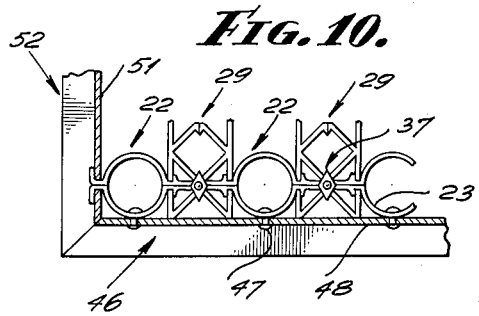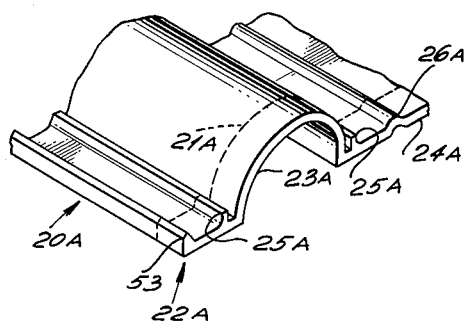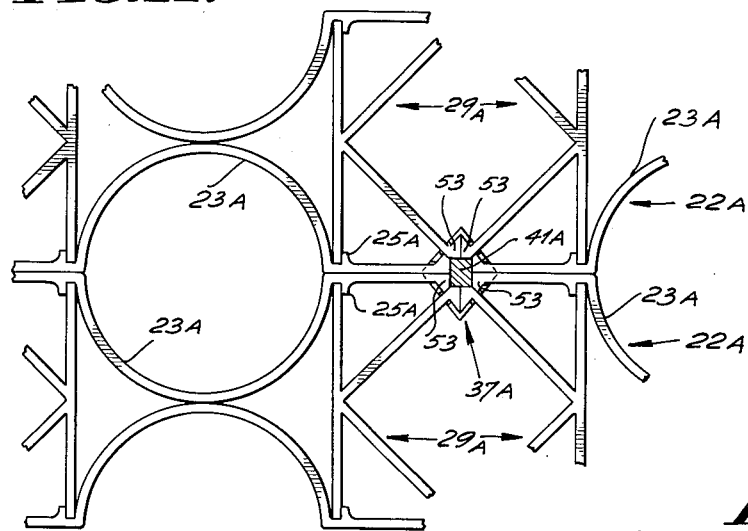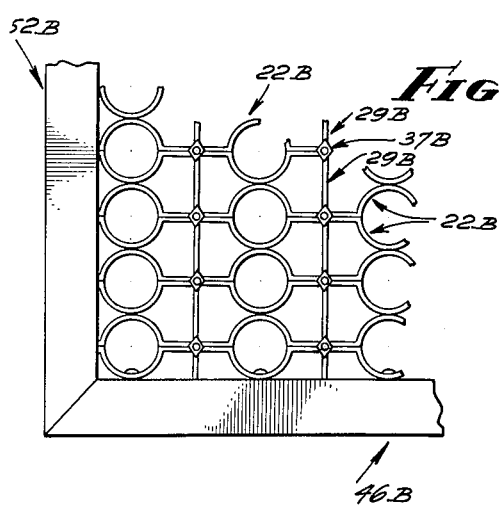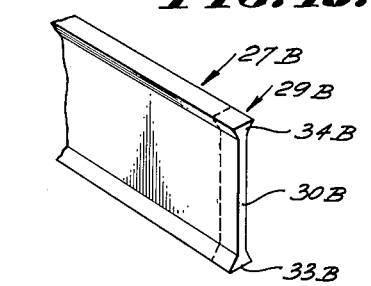

June 19, 1962 F. B. MILLER 3,039,574
GRILLWORK PANEL AND METHOD FOR MAKING SAME
Filed Feb. 15, 1960 4 Sheets-Sheet 4
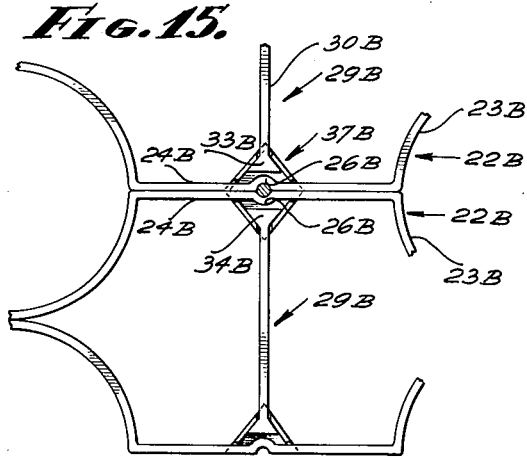
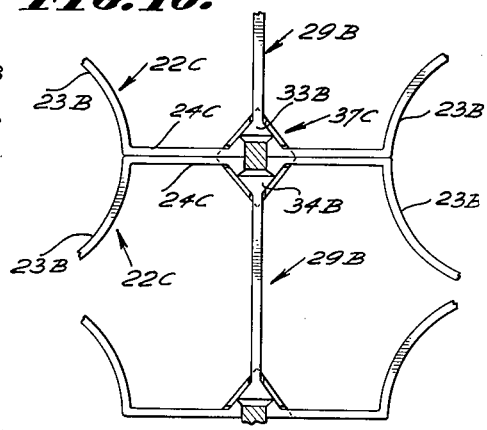
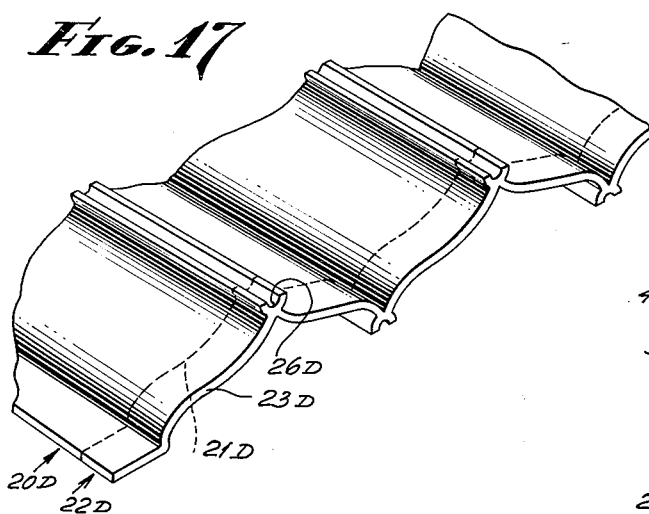
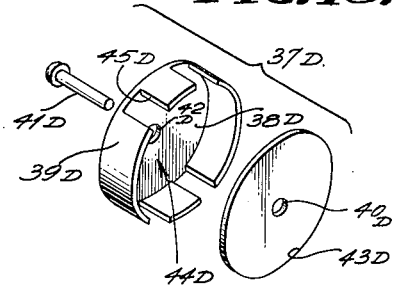
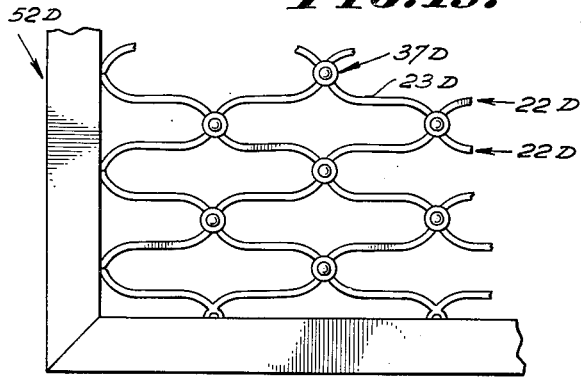
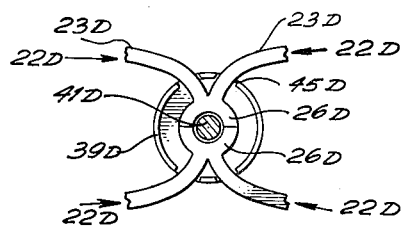
INVENTOR.
FRANK B. MILLER
BY
R. E. Grangue
ATTORNEY 3,039,574
Patented June 19, 1962

3,039,574
GRILLWORK PANEL AND METHOD FOR
MAKING SAME
Frank B. Miller, 1842 Ransome Road, Glendale, Calif.
Filed Feb. 15, 1960, Ser. No. 8,682
9 Claims. (Cl. 189—82)

The present invention relates to the architectural, structural and building arts and, more particularly, relates to improved architectural and/or structural perforate grillwork panel, screen or wall and an improved method for making same.

It should be noted that such panels may be used as room dividers, as wall sections, as sunshades or filters adapted to effectively allow the passage of air therethrough and let a person look horizontally therethrough while virtually preventing or substantially inhibiting the angular passage of direct sunlight therethrough, thus providing an effective sunshade structure or panel of a highly decorative appearance which may be positioned outdoors adjacent porches, patios, or the like, or which may be positioned adjacent windows or the like in a manner such as to effectively shade the window from direct sunlight and yet be spaced sufficiently far away from the window to allow free access thereto for cleaning purposes, or the like.

The decorative panel of the present invention may be used for doors, partitions, or wherever it is desired to provide a panel, screen or wall inhibiting the angular direct passage of sunlight therethrough while allowing the free passage of air therethrough and allowing direct horizontal visibility therethrough, or wherever the highly decorative effect of the grillwork structure is desired.

A major feature of the present invention is the fact that the improved architectural panel is made of an extrudable material such as aluminum, or the like, although various other lightweight materials may be employed, cut off to a desired depth in the extrusion direction, and then assembled into a desired relationship, which is usually an alternately reversed stacked relationship with adjacent integral extrusion-formed fastening elements in abutting contact, and then confiningly fastened by confinement fastening clamp or cup means receiving, confining, and joining the adjacent fastening elements whereby to provide a rigid multi-element grillwork panel of extremely easy-to-manufacture and easy-to-assemble construction and which is adapted to assume a plurality of pleasing perforate configurations by assembling together and confiningly fastening together, by confinement clamp means, a plurality of different types of extruded members of the type referred to above, and each of which may be provided in a transverse direction therealong with a plurality of different contoured or shaped portions connected by intervening or interconnecting portions carrying the fastening elements; the arrangement being such that the contoured or shaped portions of alternately reversed stacked main structural members effectively positioned together in each such reversed pair of the plurality of pairs of such reversed stacked abutting contiguous main members, defines a plurality of regular recurring apertures of one or more geometrical cross-sectional shapes presenting a pleasing exterior appearance and having a plurality of through apertures of a depth in the extrusion direction such as to inhibit or virtually prevent the angular passage therethrough of direct sunlight or other strong light, while allowing the free passage of air therethrough and allowing direct horizontal vision therethrough.

In one form of the invention, a plurality of extruded and cut-off, appropriately shaped auxiliary members may be interspaced between adjacent stacked pairs of the main members and may additionally be provided with integral extrusion-formed fastening elements adapted to be confined within and abuttingly fastened within the plurality of confinement fastening clamps or cups, whereby to provide a highly decorative architectural panel or screen having the characteristics described above and adapted to be cheaply and easily manufactured and assembled.

The present invention also comprises an improved method for making an architectural panel of the type described above comprising the extrusion, cut-off, alternately reversed stacked assembly, and confinement fastening of adjacent fastening elements.

Various prior art architectural perforate grillwork panels have been invented and developed heretofore. However, all such prior art panels of this type have disadvantages of one type or another, such as the fact that they customarily are made of cast members rather than extruded members, which automatically limits the size of each member to both a predetermined depth and a predetermined width in the transverse direction, and which makes the architectural panel made of such castings considerably more costly than the improved architectural panel of the present invention, involving the extruded structural members which may be cut off to any desired depth and then assembled in stacked relationship (in one preferred form, in alternately reversed stacked relationship) and confiningly fastened together by confinement fastening means engaging fastening elements extrusion-formed on said extruded members. It should also be noted that the present invention provides for walls or panels of any desired height by merely stacking more or less of the extruded structural members and provides for walls of any desired transverse width by merely adding additional stacked structural members in end abutment with respect to corresponding first stacked structural members and confiningly fastened thereto in end-to-end abutment, thus making it possible to construct a modular type architectural panel of various desired heights and widths, in addition to the fact that any desired depth can be provided by merely cutting off the extruded structural members to the desired depth.

In other words, the improved architectural panel of the present invention and the method for making same, makes it possible to cheaply and easily provide an architectural panel of virtually any desired size, as to height, as to width, and as to depth, and to do so in a structure largely made of extruded members which are substantially cheaper to manufacture and assemble with the confinement fastening means of the present invention than conventional prior art castings and modes of fastening same.

Furthermore, the abutment confinement type fastening of the present invention is better than conventional prior art rigid fastening because offset fastening members of the conventional prior art type are not required and because the novel confinement abutting fastening arrangement of the present invention requires a minimum number of confinement fastening clamps or cups located at a minimum number of fastening points, thus reducing assembly costs, and additionally does not require any drill holes, threaded fasteners, welding, or the like, of the prior art type, which also would add cost to the panel.

It should also be noted that the method of alternately reversing extruded, shaped, and cut off main structural members makes is possible to effectively provide geometrical shapes which would otherwise be hard to form, such as full circles, and the like.

With the above points in mind, it is an object of the present invention to provide an improved architectural perforate grillwork panel of the type described above and having the advantages described above and which may be said, briefly, to consist of a plurality of extruded structural members cut off to desired depths (usually to a substantially uniform depth) in the extrusion direction and assembled in stacked relationship (usually in pairs of alternately reversed stacked members) and then confiningly fastened together by means of confinement fastening clamp or cup means receiving, confining, and joining in abutting contact adjacent fastening elements integrally carried by the extruded structural members whereby to provide a multi-element grillwork panel having a high decorative appearance and embodying a plurality of through apertures of a depth such as to substantially inhibit or prevent the direct angular passage of sunlight or other strong light therethrough while allowing the free passage of air therethrough and allowing direct horizontal vision therethrough.

It is a further object of the present invention to provide an improved architectural panel of the character referred to in the preceding object, which is so constructed of a plurality of stacked confiningly fastened extruded cutoff structural members as to make it possible to easily make the architectural panel of virtually any desired height, width in the transverse direction, and depth in the extrusion direction, and also which makes possible a variety of attractive grillwork designs by assembly and confinement fastening of different extruded members.

It is a further object to provide an improved architectural panel of the character set forth above, which requires a minimum number of confinement clamps or cups at a minimum number of fastening locations in order to effectively fasten together an assembly consisting of a plurality of stacked and usually alternately reversed extruded and cutoff structural members, whereby to minimize assembly time and cost, the confinement fastening being of an end abutment type which does not require offset, drilled, fastener elements and which does not require threaded fasteners, welding, and the like, thereby additionally reducing assembly time and costs.

It is a further object to provide an improved architectural panel of the character referred to in any of the preceding objects, which is of exceedingly simple, cheap, foolproof, easy-to-manufacture and easy-to-assemble construction such as to facilitate widespread use thereof.

It is a further object to provide a method for manufacture of an architectural panel of the type referred to above comprising the step of extruding a plurality of the shaped structural members, cutting them off to desired depth, assembling them in spaced partially abutting relationship (usually alternately stacked reversed relationship) and confiningly fastening fastener elements integrally carried by said members in confined abutting relationship within a plurality of confinement fastening clamps or cups.

Other and allied objects will be apparent to those skilled in the art after a careful perusual, examination, and study of the accompanying illustrations the present specification, and the appended claims.

To facilitate understanding reference will be made to the hereinbelow-described figures, in which:

FIGURE 1 is a perspective view illustrating the first extrusion step of the method aspect of the present invention, whereby one main structural member extrusion having a plurality of shaped or contoured portions in a direction transverse to the extrusion direction is formed by extrudable material such as aluminum, or the like, although not specifically so limited through an extrusion die (not shown) having the same cross-sectional shape as that shown at the near end of the main structural member illustrated in FIGURE 1, the contoured portions of the main structural member, in the specific form illustrated in FIGURE 1, being of semicircular shape joined by intervening or interconnecting substantially flat portions; said view also illustrating a subsequent step of the method aspect of the present invention comprising cutting off the main structural member extrusion shown in FIGURE 1 along the broken line which is at a substantially uniform depth in the extrusion direction whereby to form a uniform depth main structural member contoured or shaped in the transverse direction in the manner shown;

FIG. 2 is a view generally similar to FIG. 1 illustrating another step in the method aspect of the present invention wherein an auxiliary structural member extrusion is formed by extruding same through an extrusion die (not shown) having the same cross-sectional shape as that shown at the near end of the auxiliary structural member illsutrated in FIG. 2; said view also illustrating a subsequent step of the method aspect of the present invention comprising cutting off the auxiliary structural member extrusion shown in FIG. 2 along the broken line, which is at a substantially unform depth in the extrusion direction whereby to form a uniform depth auxiliary structural member;

FIG. 3 is an exploded view of one exemplary type of confinement fastening clamp or cup means employed in the method step of the present invention comprising the confinement fastening of adjacent abutting fastening elements of the plurality of main and auxiliary structural members of the type illustrated individually in FIGS. 1 and 2 when assembled in alternately reversed stacked relationship in the manner shown in sequence in FIGS. 7–9 and also shown in FIG. 4;

FIG. 4 is a fragmentary rear elevational view of a portion of an architectural panel formed in accordance with the method of the present invention out of a plurality of main structural members of the type illustrated individually in FIG. 1 and auxiliary structural members of the type illustrated individually in FIG. 2, which are fastened together by confinement fastening clamp means of the type shown individually in FIG. 3, and each of which does not yet have its back plate fastened thereto as illustrated in FIG. 4;

FIG. 5 is a fragmentary front elevational view of an architectural panel of the type shown from the rear in FIG. 4 and illustrates the end and bottom fastening of the main structural members with respect to side and bottom frame portions and additionally illustrates corner fastening of said side and bottom frame portions to each other;

FIG. 6 is a greatly reduced-size fragmentary perspective view of a portion of an architectural panel of the type shown in FIG. 5 showing it carried in a fragmentary surrounding frame;

FIG. 7 is a fragmentary front elevational view illustrating an initial assembly step in the complete assembly of an architectural panel of the type illustrated in FIGS. 4, 5, and 6;

FIG. 8 is a view similar to FIG. 7 illustrating a subsequent assembly step;

FIG. 9 is a view similar to FIGS. 7 and 8 illustrating a next subsequent assembly step;

FIG. 10 is a view similar to FIGS. 7–9 but illustrates the next step comprising the confinement fastening of adjacent abutting fastening elements;

FIG. 11 is a fragmentary view, with one end broken away, illustrating a slight modification of the main extruded and cut-off structural member and the method step embodied in the manufacture thereof illustrated in FIG. 1, wherein one of the transverse ends of the main structural member is provided with an additional end fastening element of a different type from those illustrated in FIG. 1, and wherein a plurality of such main structural members are adapted to be assembled in accordance with the general method steps previously illustrated and wherein additional main structural members may be placed in end-to-end alignment with the end fasteners in end-to-end abutment and then confinement fastened together in end-to-end alignment in a modified confinement fastener of the type illustrated in FIGURE 12, whereby to make it possible to construct a panel of any desired width by merely adding additional structural members of the type shown in FIGURE 11 and confinement fastening them in end-to-end alignment;

FIGURE 12 is a fragmentary rear elevational view of a slightly modified form of architectural panel with the rear plate of the modified confinement fastener removed, and illustrates a plurality of modified main structural members of the type shown in FIGURE 11 fastened together by the modified confinement fastening means so as to make it possible to construct an architectural panel of any desired width;

FIGURE 13 is a perspective view generally similar to FIGURE 2 but illustrating a modified form of auxiliary structural member of substantially I-shape, as seen in end elevation, rather than of substantially K-shape like the end elevational configuration of the auxiliary structural member illustrated in FIGURE 2;

FIGURE 14 is a fragmentary front elevational view of a modified type of panel embodying main structural members similar to the one shown individually in FIGURE 1 (with minor modification thereof) and modified auxiliary structural members, such as the one shown individually in FIGURE 13, adapted to be fastened together by modified fastening clamp means of the type best shown in FIGURE 15;

FIGURE 15 is a fragmentary rear elevational view of the form of architectural panel illustrated in FIGURE 14 with the rearplate of the confinement fastening means removed;

FIGURE 16 is a view very similar to FIGURE 15, except that the confinement fastening means engages fastening elements carried at the ends of horizontally aligned main structural members in addition to fastening elements carried at the ends of vertically aligned auxiliary fastening members, thus providing a modular type of panel arrangement which may be of any desired width or height;

FIGURE 17 is a fragmentary perspective view similar to FIGURES 1 and 11 but illustrating a slightly different type of main structural member;

FIGURE 18 is an exploded view similar to FIGURE 3 showing a modified type of confinement fastening clamp;

FIGURE 19 is a fragmentary front elevational view of a modified type of architectural panel made of an assembled plurality of modified main structural members of the type shown in FIGURE 17 fastened together by modified confinement clamp means of the type shown in FIGURE 18; and FIGURE 20 is an enlarged fragmentary rear elevational view of one of the confinement clamp means of the type shown in FIGURE 18 fastening together the fastening elements of the stacked modified main structural members illustrated in FIGURE 19, with the rear plate removed for clarity.

Generally speaking, the apparatus or structural form of the present invention may be said to consist of a plurality of similar extruded main structural members formed by extrusion and cut off to a desired depth and subsequently assembled in stacked relationship (usually together with a plurality of extruded and cut-off auxiliary structural members) and then confiningly fastened by confinement fastening means to provide a grillwork panel.

In the specific example illustrated in FIGURES 1-10, and individually shown in FIGURE 1, one specific form of main structural member extrusion is indicated generally at 20 after it has been extruded in an extrusion or depth direction, indicated by the arrow E, through an extrusion die (not shown but of a conventional type) having a cross-sectional die aperture shaped corresponding to the near edge of the structural member extrusion illustrated in FIGURE 1. After completion of the extrusion operation, the main structural member extrusion 20, shown fragmentarily in FIGURE 1, is then cut off by suitable cut-off means (not shown since such apparatus is well known in the art) at a desired depth, such as is indicated by the broken line 21 in FIGURE 1, whereby to provide a cut-off main structural member, indicated generally at 22, having a plurality of contoured portions 23 (in this example, of semi-circular shape) transversely interconnected by a plurality of substantially straight intervening or interconnecting portions 24, which include upwardly directed projections 25, the purpose of which will be explained hereinafter, and very small semi-circular fastening elements 26 centrally formed by the extrusion process at the middle of each interconnecting or intervening flat substantially straight portion 24. The purpose of the fastening elements 26 will be described in greater detail hereinafter.

In the specific example illustrated in FIGURES 1-10, and individually shown in FIGURE 2, one specific form of auxiliary structural member extrusion is indicated generally at 27 after it has been extruded in an extrusion or depth direction, indicated by the arrow F, through an extrusion die (not shown, but of a conventional type) having a cross-sectional die aperture shaped corresponding to the near end of the auxiliary structural member extrusion illustrated in FIGURE 2, said cross-section of the auxiliary structural member extrusion 27 being substantially K-shaped. After completion of the extrusion operation, the auxiliary structural extrusion member 27, suitable cut-off means (not shown since such apparatus is well known in the art) at a desired depth, usually the same depth as the cut-off main structural member 22 shown in FIGURE 1, such as is indicated by the broken line 28 in FIGURE 2, whereby to provide a cut-off auxiliary structural element, indicated generally at 29, of substantially K-shape consisting of a straight outer member 30, a substantially angularly downwardly and inwardly directed lower member 31 and a substantially angularly inwardly and upwardly directed upper member 32, with said lower and upper members 31 and 32 carrying angular fastening elements 33 and 34 projecting upwardly and downwardly, respectively, toward each other and having flat outer contact surfaces 35 and 36.

FIGURE 3 illustrates confinement fastening clamp means, indicated generally at 37, comprising a first substantially flat and usually vertical wall or plate 38 provided with substantially perpendicular edge flange means 39, a second similarly shaped substantially flat and usually vertical closure plate 40, and fastening means comprising a headed rivet 41 adapted to pass through aligned apertures 42 and 43 in the walls or plates 38 and 40, respectively, and then to be flattened at its outer end whereby to confiningly lock the fastening clamp means 37 together with the vertically reversed fastening elements 26 of pairs of reversed main structural members 22 and the horizontally reversed or transversely reversed fastening elements 33 and 34 of the auxiliary structural members 29 all locked within the hollow confinement enclosure, indicated generally at 44, of the fastening clamp means 37 and with connecting portions 24 of the main structural members 22 and the upper and lower angular portions 31 and 32 of the auxiliary structural members 29 passing through appropriately spaced slots 45 in the edge flange 39, thus providing transverse abutment of opposed flat contact surfaces 35 and 36 of the fastening elements 33 and 34 with each other and vertical abutment of the fastening elements 26 with corresponding upper and lower portions of the rivet 41, when the fastening clamp means 37 is completely closed and locked by the flattened rivet 41.

It should be noted that each of the transversely reversed auxiliary structural members 29 has its outer straight member 30 positioned in the slot defined between the corresponding projection 25 and the adjacent part of the adjacent semi-circular portion 23 to provide firm anchoring of the auxiliary structural members 29. It should be noted that the method of the present invention involves several intermediate steps prior to the confinement fastening of the fastening elements by the confinement fastening clamps 37, just described. This sequence of method steps is best shown in FIGURES 7-10. It should be noted that FIGURE 7 shows a first main structural member 22 fastened in inverted position with respect to a frame bottom portion 46 by means of suitable rivets 47 fastening the lowermost portion of each of the semi-circular contoured portions 23 to the upper wall 48 of the channel-type lower frame portion 46, with the left end 49 of the main structural member 22 projecting through an aperture 50 in the inner wall portion 51 of the side frame portion 52 and adapted to be subsequently bent down in the manner best shown in FIGURE 5 in order to lock said main structural member 22 with respect thereto.

FIGURE 8 shows a second main structural member 22 reversed and stacked upon the first or lowermost main structural member 22 whereby the vertically opposed semi-circular portions 23 effectively define circles and whereby upper and lower surfaces of the intervening or interconnecting members 24 abut one another with the fastening elements 26 centrally opposed to each other. It should be noted that the left end 49 of this reversed main structural member 22 is bent upwardly while the left end 49 of the lower main structural member 22 is bent downwardly, as is best shown in FIGURE 5.

FIGURE 9 illustrates the next method step, wherein a plurality of auxiliary structural members 29 of the type individually shown in FIGURE 2 are placed between the semi-circular portions 23 of each pair of main structural members 22 in horizontally or transversely reversed relationship whereby to place opposed surfaces 35 and 36 (shown in FIGURE 2) of the fastening elements 33 and 34 in transverse abutment, as is best shown in FIGURE 4, after which the fastening clamp means 37, individually shown in FIGURE 3, is moved into confining enclosing fastening engagement around all of the adjacent pairs of fastening elements 26, 33, and 34, and the closure plate 40 is rigidly fastened to the remainder of the clamp 37 by the rivet 41, which is flattened, thus rigidly locking the assembly of extruded structural members together to form an architectural panel of the type fragmentarily shown in FIGURE 10 illustrating this last method step.

FIGURE 4 illustrates the last method step before fastening the closure plate 40 of each of the fastening clamps 37 to the remainder of the corresponding clamp.

FIGURE 11 illustrates a slightly modified form of main structural member, indicated at 22A, extruded and cut off in a manner similar to that described in connection with the main structural member 22 shown in FIGURE 1 and with corresponding parts being indicated by corresponding reference numerals, followed by the letter "A," however. The major difference of this modification from the first form described and illustrated is that one or the other or both outer ends of the main structural member 22A may be provided with upwardly projecting fastening elements 53 adapted to be transversely engaged and rigidly locked within a slightly modified confinement fastening clamp shown at 37A in FIGURE 12 with the rear closure plate removed, it being understood that, in this modification, any desired number of main structural members 22A may be fastened together in transverse or horizontal alignment by modified fastening clamps of the type shown at 37A so that an architectural panel of any desired width can be easily constructed. Othewise, this modification of the invention is quite similar to the first form illustrated in FIGURES 1–10 and any further detailed description is thought to be redundant.

FIGURE 13 illustrates a slightly modified form of auxiliary structural member 29B generally similar to that shown at FIGURE 2 in the first form of the invention, and similar parts will be indicated by similar reference numerals, followed by the letter "B," however. This modified auxiliary structural member is adapted to cooperate with slightly modified main structural members of the type indicated generally at 22B in FIGURES 14 and 15 and to be confiningly fastened by a slightly modified form of confinement fastening clamp indicated generally at 37B, in the manner best shown in FIGURE 15 wherein the back closure plate of the modified confinement fastening clamp 37B is removed for drawing clarity. This arrangement provides a somewhat different appearing architectural panel best shown in fragmentary form in FIGURE 14.

FIGURE 16 illustrates in fragmentary form the auxiliary structural member means 29B of the type shown in FIGURES 13–15 employed in connection with another slightly modified form of main structural member means, indicated generally at 22C, which is very similar to the form 22A shown in FIGURES 11 and 12 except that no projections corresponding to those shown at 25A in FIGURE 12 are included in this modification. This arrangement is such that any desired number of the modified main structural members 22C may be confiningly fastened together in horizontal end-to-end alignment by the modified fastening clamp means indicated generally at 37C in FIGURE 16 whereby an architectural panel of any desired width may be easily constructed. Otherwise this modification of the invention is quite similar to the form illustrated in FIGURES 13–15 and further detailed description is thought to be redundant.

FIGURE 17 illustrates another slightly modified form of main structural member 22D wherein the fastening elements 26D are carried at the apex of each of the curved or contoured portions 23D. Otherwise, this modification is quite similar to the main structural member shown at 22 in FIGURE 1, and similar portions are indicated by similar reference numerals, followed by the letter "D." Alternately vertically reversed modified main structural members 22D are adapted to be stacked in the manner shown in fragmentary form in FIGURE 19 with a modified confinement fastening clamp means of the type indicated generally at 37D fastening opposed fastening elements 26D together in the general manner hereinbefore described in connection with earlier versions of the fastening clamp means, this specific modification being best shown in FIGURE 20 where the back closure plate is removed for drawing clarity. Otherwise, this modification of the invention is quite similar to the earlier versions except that no auxiliary structural members such as those shown at 29 and 29B in earlier versions of the invention are included. Therefore, further detailed description is thought to be redundant.

Numerous modifications and variations of the present invention will occur to those skilled in the art after a careful study hereof. All such properly within the basic spirit, scope and/or teachings of the present invention are intended to be included and comprehended herein as fully as if specifically described, illustrated, and claimed.

The exact compositions, configurations, constructions, relative positionings, and cooperative relationships of the various component parts of the apparatus form of the present invention are not critical, and can be modified substantially within the spirit of the present invention.

The embodiments of the present invention specifically described and illustrated herein are exemplary only, and are not intended to limit the scope of the present invention, which is to be interpreted in the light of the prior art and the appended claims only, with due consideration for the doctrine of equivalents.

What is claimed is:

1. An improved grillwork panel, comprising: a plurality of main structural members provided with fastening elements and a plurality of auxiliary structural members provided with fastening elements together forming a grillwork structure defining a pluraliy of spaced apertures extending therethrough in a depth direction; and a plurality of confinement fastening clamp means receiving, confining, and joining adjacent fastening elements of said main and auxiliary structural members to provide a rigid multi-structural-member grillwork panel each of said confinement fastening clamp means joining at least two fastening elements of said auxiliary structural members and joining two fastening elements of said main structural members rigidly together.

2. An improved grillwork panel, comprising: a plurality of main structural members provided with adjacent fastening elements and a plurality of auxiliary structural members provided with adjacent end fastening elements together forming a grillwork structure defining a plurality of spaced apertures extending therethrough in a depth direction; and a plurality of confinement fastening clamp means receiving, confining, and joining adjacent fastening elements of said main and auxiliary structural members to provide a rigid multi-structural-member grillwork panel each of said confinement fastening clamp means joining four adjacent end fastening elements of said auxiliary structural members and joining two adjacent fastening elements of said main structural members rigidly together.

3. An improved grillwork panel, comprising: a plurality of similar extruded main structural members transversely similarly repetitively contoured therealong and provided with adjacent fastening elements and a plurality of similar extruded shaped auxiliary structural members provided with adjacent end fastening elements together forming a grillwork structure defining a plurality of spaced apertures extending therethrough in a depth direction and of regular repeating cross-sectional shape; and a plurality of confinement fastening clamp means receiving, confining, and joining adjacent fastening elements of said main and auxiliary structural members to provide a rigid multi-structural-member grillwork panel each of said confinement fastening clamp means joining four adjacent end fastening elements of said auxiliary structural members and joining two adjacent fastening elements of said main structural members rigidly together.

4. An improved grillwork panel, comprising: a plurality of alternately reversed main structural members provided with fastening elements and a plurality of alternately reversed auxiliary structural members provided with fastening elements together forming a grillwork structure defining a plurality of spaced apertures extending therethrough in a depth direction; and a plurality of confinement fastening clamp means receiving, confining, and joining adjacent fastening elements of said main and auxiliary structural members to provide a rigid multi-structural-member grillwork panel each of said confinement fastening clamp means joining at least two fastening elements of said auxiliary structural members and joining two fastening elements of said main structural members rigidly together.

5. An improved grillwork panel, comprising: a plurality of alternately reversed contoured main structural members provided with adjacent fastening elements and a plurality of alternately reversed shaped auxiliary structural members provided with adjacent end fastening elements together forming a grillwork structure defining a plurality of spaced apertures extending therethrough in a depth direction; and a plurality of confinement fastening clamp means receiving, confining, and joining adjacent fastening elements of said main and auxiliary structural members to provide a rigid multi-structural-member grillwork panel each of said confinement fastening clamp means joining at least two adjacent fastening elements of said auxilary structural members and joining two adjacent fastening elements of said main structural members rigidly together.

6. An improved grillwork panel, comprising: a plurality of alternately reversed similar extruded main structural members transversely similarly repetitively contoured therealong and provided with adjacent fastening elements and a plurality of alternately reversed similar extruded shaped auxilary structural members provided with adajacent end fastening elements together forming a grillwork structure defining a plurality of spaced apertures extending therethrough in a depth direction and of regular repeating cross-sectional shape; a plurality of confinement fastening clamp means receiving, confining, and joining adjacent fastening elements of said main and auxiliary structural members to provide a rigid multi-structural-member grillwork panel; and frame means carrying the assembled fastened panel and including spaced frame portions engaging ends of said main structural members at opposite ends of the assembled fastened panel each of said confinement fastening clamp means joining four adjacent end fastening elements of said auxiliary structural members and joining two adjacent fastening elements of said main structural members rigidly together.

7. An improved grillwork panel, comprising: a plurality of similar extruded structural members similarly repetitively contoured in a first direction and provided with abutting portions including corresponding adjacent fastener elements, and each being contiguously stacked in a second direction substantially perpendicular to said first direction and in alternately reversed partially abutting relationship with alternate fastening elements adjacent to each other whereby to form a grillwork structure defining a plurality of apertures extending therethrough in a direction substantially perpendicular to said first and second directions, and being of regular repeating cross-sectional shape; a plurality of similar extruded shaped auxiliary structural members positioned between stacked reversed pairs of said main structural members and extending in said second stacking direction, each of said auxiliary members being provided at opposite ends thereof with fastening element means; and a plurality of confinement fastening clamp means receiving, confining, and joining adjacent fastening elements of said main and auxiliary structural members to provide a rigid multi-structural-member grillwork panel each of said confinement fastening clamp means joing at least two adjacent fastening elements of said auxiliary structural members and joining two adjacent fastening elements of said main structural members rigidly together with said auxiliary and main structural members in perpendicular relationship to each other.

8. An improved grillwork panel, comprising: a plurality of similar extruded structural members similarly repetitively contoured in a first direction and provided with abutting portions including corresponding adjacent fastener elements, and each being contiguously stacked in a second direction substantially perpendicular to said first direction and in alternately reversed partially abutting relationship with alternate fastening elements adjacent to each other whereby to form a grillwork structure defining a plurality of apertures extending therethrough in a direction substantially perpendicular to said first and second directions, and being of regular repeating cross-sectional shape; a plurality of similar extruded shaped auxiliary structural members positioned between stacked reversed pairs of said main structural members and extending in said second stacking direction, said auxiliary members being arranged in reversed pairs abutting one another in said first direction, with one such pair being located between each similar contoured portion of any given main structural member and extending in said second stacking direction between non-abutting portions of stacked reversed pairs of each main structural members, each of said auxiliary members being provided at opposite ends thereof with fastening element means centrally positioned between contoured portions of adjacent main members; and a plurality of confinement fastening clamp means receiving, confining, and joining adjacent fastening elements of said main and auxiliary structural members to provide a rigid multi-structural-member grillwork panel.

9. An improved grillwork panel, comprising: a plurality of similar extruded main structural members having a plurality of similar repetitively contoured portions defining similar half parts of similar geometrical shapes therealong in a first direction interspersed by intermediate substantially straight abutting portions adapted to abut similar abutting portions of an adjacent reversed main structural member, and each being contiguously stacked in a second direction substantially perpendicular to said first direction and in alternately reversed abutting relationship whereby to form a grillwork structure defining a plurality of apertures extending therethrough in a direction substantially perpendicular to said first and second directions, and being of regular repeating geometrical cross-sectional shape, each of said abutting portions of each main structural member being provided with similar fastening element means symmetrically centrally positioned between adjacent contoured portions of said main structural member; a plurality of similar extruded shaped auxiliary structural members slidably abuttingly positioned between the non-abutting sides of each of said abutting substantially straight portions of stacked reversed pairs of said main structural members and extending in said second stacking direction, each of said auxiliary members being provided at opposite ends thereof with fastening element means centrally positioned between contoured portions of adjacent main members; a plurality of confinement fastening clamp means receiving, confining, and joining adjacent fastening elements of said main and auxiliary structural members to provide a rigid multi-structural-member grillwork panel; and frame means carrying the assembled fastened panel and including spaced frame portions engaging ends of said main structural members at opposite ends of the assembled fastened panel each of said confinement fastening clamp means joining four adjacent end fastening elements of said auxiliary structural members and joining two adjacent fastening elements of said main structural members rigidly together with said auxiliary and main structural members in perpendicular relationship to each other.

References Cited in the file of this patent
UNITED STATES PATENTS

| | | |
|---|---|---|
| 1,160,044 | Coakley | Nov. 9, 1915 |
| 1,196,360 | Hooker | Aug. 29, 1916 |
| 1,612,236 | Thomson | Dec. 28, 1926 |
| 1,703,608 | Bettles | Feb. 26, 1929 |
| 1,781,458 | Gore | Nov. 11, 1930 |
| 1,817,463 | Price | Aug. 4, 1931 |
| 1,878,992 | Shelton | Sept. 20, 1932 |
| 1,985,372 | Herz | Dec. 25, 1934 |
| 2,288,013 | Moynahan et al. | June 13, 1942 |
| 2,641,042 | Kopp | June 9, 1953 |

FOREIGN PATENTS

| | | |
|---|---|---|
| 509,423 | Belgium | Mar. 15, 1952 |